United States Patent
Benner et al.

(10) Patent No.: US 10,737,205 B2
(45) Date of Patent: Aug. 11, 2020

(54) LIQUID FILTER ARRANGEMENT AND METHODS

(71) Applicant: Donaldson Company, Inc., Minneapolis, MN (US)

(72) Inventors: Glenn D. Benner, Minneapolis, MN (US); Jason R. Platz, Mendota Heights, MN (US); Paul W. Lundberg, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 86 days.

(21) Appl. No.: 15/516,770

(22) PCT Filed: Oct. 12, 2015

(86) PCT No.: PCT/US2015/055128
§ 371 (c)(1),
(2) Date: Apr. 4, 2017

(87) PCT Pub. No.: WO2016/060991
PCT Pub. Date: Apr. 21, 2016

(65) Prior Publication Data
US 2017/0296950 A1    Oct. 19, 2017

Related U.S. Application Data

(60) Provisional application No. 62/063,759, filed on Oct. 14, 2014.

(51) Int. Cl.
*B01D 35/30* (2006.01)
*B01D 29/11* (2006.01)
*B01D 35/027* (2006.01)

(52) U.S. Cl.
CPC .......... *B01D 35/30* (2013.01); *B01D 29/115* (2013.01); *B01D 35/027* (2013.01);
(Continued)

(58) Field of Classification Search
CPC .... B01D 35/30; B01D 35/027; B01D 29/115; B01D 35/0276; B01D 2201/305;
(Continued)

(56) References Cited

U.S. PATENT DOCUMENTS

| 6,235,194 B1 * | 5/2001 | Jousset | B01D 29/15 210/206 |
| 2008/0142426 A1 * | 6/2008 | Greco | B01D 35/143 210/234 |

(Continued)

FOREIGN PATENT DOCUMENTS

| DE | 102008036055 A1 | 2/2010 |
| WO | 2006/012031 A1 | 2/2006 |
| WO | 2011/056857 A1 | 5/2011 |

OTHER PUBLICATIONS

International Search Report issued in PCT/US2015/055128, dated Feb. 9, 2016.

*Primary Examiner* — Madeline Gonzalez
(74) *Attorney, Agent, or Firm* — Merchant & Gould P.C.

(57) ABSTRACT

A filter cartridge can be used in a filter assembly for a system in an in tank filter for a hydraulic return filter. The filter assembly includes a safety construction to ensure that a cover is not place over the bowl of the filter assembly, without a filter cartridge mounted therein. The safety construction includes a lock arrangement on the cover member arrangement, cooperating with a flange on the tank. Methods of servicing use steps to lock and unlock the lock arrangement.

8 Claims, 4 Drawing Sheets

(52) U.S. Cl.
CPC .... *B01D 35/0276* (2013.01); *B01D 2201/291* (2013.01); *B01D 2201/301* (2013.01); *B01D 2201/305* (2013.01); *B01D 2201/4046* (2013.01); *B01D 2201/4053* (2013.01); *B01D 2201/4076* (2013.01); *B01D 2201/4084* (2013.01)

(58) Field of Classification Search
CPC ...... B01D 2201/301; B01D 2201/4084; B01D 2201/4076; B01D 2201/4046; B01D 2201/291; B01D 2201/4053
USPC .............................................. 210/450, 493.2
See application file for complete search history.

(56) References Cited

U.S. PATENT DOCUMENTS

| | | | |
|---|---|---|---|
| 2012/0168359 A1* | 7/2012 | Marshall | B01D 29/21 210/136 |
| 2013/0269533 A1* | 10/2013 | Rathod | B01D 19/0031 96/219 |
| 2014/0190880 A1 | 7/2014 | Krull | |

* cited by examiner

LIQUID FILTER ARRANGEMENT AND METHODS

This application is a National Stage application of PCT International Patent application No. PCT/US2015/055128, filed Oct. 12, 2015, which claims priority to U.S. Provisional patent application No. 62/063,759, filed Oct. 14, 2014, which applications are incorporated herein by reference. To the extent appropriate, a claim of priority is made to each of the above disclosed applications.

TECHNICAL FIELD

Background

Filter devices are used in many types of applications. In one application, filter devices are used to filter hydraulic fluid, for example, hydraulic oil in hydraulic systems. In many cases, the hydraulic systems must meet high demands to fulfill intended functions while not wearing over the operating times. Over a period of use, the filter devices will become clogged with debris and particulate matter. The filter devices, therefore, must be either cleaned or replaced. In many typical filters, the filters are designed to be removed, disposed of, and replaced with new filters. Improvements in filter devices are continually being sought.

SUMMARY

The problem is to improve the prior art. To improve the prior art, a filter cartridge for use as a serviceable filter cartridge with a liquid filter assembly in an in-tank filter system with a cover is provided.

The filter cartridge comprises a region of filter media defining a central, open, volume; the region of filter media having first and second ends; a first end cap secured to the first end of the region of filter media and closed to the central open volume; an axial stem having a portion projecting away from the filter media; an end of the axial stem remote from the filter media comprising a locker engagement tip to permit the cover to close the liquid filter assembly; and a second end cap secured to the second end of the region of filter media; the second end defining a central liquid flow conduit therethrough in liquid flow communication with the central, open, volume defined by the filter media.

The axial stem can comprise a portion of the first end cap.

The axial stem includes a guide channel arrangement including at least one guide channel therein for engagement with the cover. The at least one guide channel terminates at the locker engagement tip.

The guide channel arrangement may include at least three guide channels.

The region of filter media can include a cylindrical shape.

The axial stem defines a plurality of spaced axial projections each having an end with an apex defined by sides.

Each apex is defined by sides extending at an angle, around the apex, within the range of 110 degrees-170 degrees.

Each apex may be defined by an angle within the range of 130 degrees-150 degrees.

Each apex may be in a position that is not in a center of an associated axial projection end.

A plurality of retaining clips can be projecting away from the filter media.

The retaining clips can comprise a portion of the first end cap.

A filter cover arrangement for a filter assembly including a filter cartridge and bowl is provided. The filter cover arrangement comprises a cover member; and a lock arrangement secured to the cover member. The lock arrangement has a first locked orientation and a second unlocked orientation. The lock member arrangement in the first locked orientation secures the cover member against securement to the filter assembly, if a filter cartridge is not oriented in the filter bowl. The lock arrangement in the second, unlocked orientation allows the cover member to be secured to the filter assembly when a filter cartridge is oriented in the filter bowl. The lock arrangement has an actuator arrangement configured for moving the lock arrangement from the locked orientation to the unlocked orientation upon engagement within the filter cover arrangement, when a filter cartridge is properly and operably positioned in the filter assembly in use.

The filter cover arrangement may also include a plate arrangement secured to the cover member with the lock arrangement therebetween.

The lock arrangement can comprise at least one slide member mounted on the plate arrangement; a biasing member positioned to bias the at least one slide member into the locked orientation; and the at least one slide member having a filter cartridge engagement portion thereon configured to be engaged, in use, by a filter cartridge to bias the at least one slide member against the biasing member to move the lock arrangement to the unlocked orientation.

The lock arrangement can comprise two opposed slide members each of which is biased by the same biasing member, each of which has a filter cartridge engagement portion.

The two slide members can each have a pin-receiving aperture at an end opposite of the filter cartridge engagement portion.

A plate arrangement may include a pair of opposite openings, each being positioned for alignment with one of the pin-receiving apertures of the slide members.

The biasing member may be a spring.

The plate arrangement can include a cartridge retention arrangement for releasably securing a filter cartridge.

The cartridge retention arrangement can include slots to receive cartridge retaining clips.

The cover member can include a cartridge positioning projection arrangement therein.

A filter assembly is provided mounted in a tank having an opening for the filter assembly. The filter assembly includes a filter cover arrangement as variously characterized herein; a flange; a filter bowl secured to the flange, and the cover member releasably mounted to the flange; and a filter cartridge as variously characterized herein positioned within the filter bowl, with the axial stem of the first end cap engaging the two slide members of the lock arrangement and biasing them into the unlocked orientation.

The filter assembly may include a flange secured to the tank at a perimeter of the tank opening; and at least one locking pin projecting from the flange and received by the lock arrangement.

The at least one locking pin can include two locking pins received within the pin-receiving apertures of the two slide members.

The two locking pins can be received within the openings of the plate arrangement.

The retaining clips of the filter cartridge can be releasably engaged with the plate arrangement and include a cartridge retention arrangement of the plate arrangement.

The guide channel arrangement of the filter cartridge can be in juxtaposition with the cartridge positioning arrangement of the filter cover arrangement.

A method of locking a cover member against securement to a flange and filter bowl assembly can include a step of removing the filter cartridge, as variously characterized herein, from the cover member arrangement, as variously characterized herein, and pulling the axial stem of the filter cartridge out of engagement with the actuator arrangement to allow the lock member arrangement to bias into the locked orientation.

A method of unlocking a cover member for securement to a flange and filter bowl assembly includes a step of pushing the axial stem of the filter cartridge, as variously characterized herein, into the cover member arrangement, as variously characterized herein, to push the actuator arrangement and move the lock member arrangement into the unlocked orientation.

DETAILED DESCRIPTION

Figure 1:
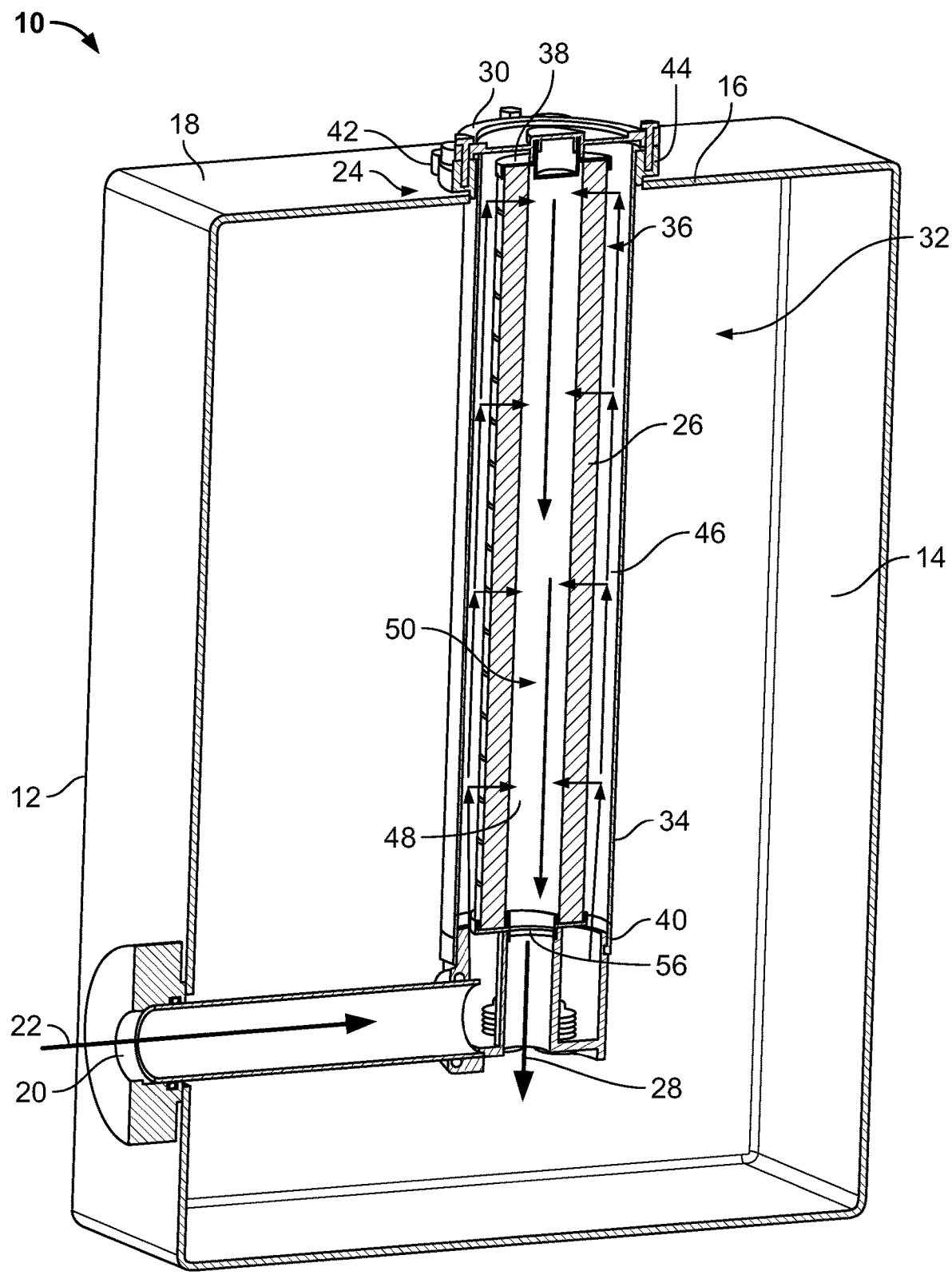
FIG. 1 is a schematic, perspective, cross-sectional view of an embodiment of a hydraulic filter system, constructed in accordance with principles of this disclosure.

FIG. 1 illustrates a schematic view of a filter system 10. While the principles described herein can be applicable to many types of systems, in the example shown, the filter system 10 is a hydraulic filter system having a return filter.

The filter system 10 includes a tank 12. The tank 12 has an interior volume 14. The tank 12 holds in the interior volume 14 filtered fluid, such as filtered hydraulic fluid or oil.

The tank 12 has an access opening 16, depicted here in a top wall 18 of the tank 12. The tank 12 further includes an inlet 20.

In this example, hydraulic fluid is kept in interior volume 14 of the tank 12. As the hydraulic system of the tractor or other component needs hydraulic oil, the hydraulic fluid leaves the tank 12 and is used by the various components. After use, the used fluid returns to the tank 12 by passing through the inlet 20. This is shown at arrow 22. The fluid then enters a filter assembly 24. The fluid is then cleaned by the filter assembly 24 by passing through filter media 26. The filtered fluid then exits the filter assembly 24 at arrow 28 and is stored in the tank 12 until it is again demanded for use by the equipment.

The filter assembly 24 includes a cover member 30 and a bowl-cartridge filter 32. The bowl-cartridge filter 32 includes an outer bowl, can, or housing 34 and a removable and replaceable filter cartridge 36. The filter cartridge 36 includes filter media 26, which in this example, is a cylindrical extension of filter media 26. In many typical systems, the filter media 26 extends between opposite end caps described herein as first end cap 38 and second end cap 40.

The filter assembly 24 is operably oriented in the tank 12 through the access opening 16. A flange 42 is secured to the tank 12 at the access opening 16.

In the example shown in FIG. 1, the flange 42 is secured at a perimeter of the access opening 16 of the tank opening. The cover member 30 engages the flange 42 to secure the filter assembly 24 in an operable position in the tank 12.

In FIG. 1, it can be seen how the volume between the inside of the bowl 34 and the outside of the filter media 26 comprises an unfiltered liquid volume 46. A filtered liquid volume 48 is downstream of the filter media 26, and in the example shown, is in a central open volume 50 of the region of filter media 26.

In the example shown in FIG. 1, the first end cap 38 is a closed end cap and is closed to the central open volume 50. The first end cap 38 is secured to a first end of the region of filter media 26. The second end cap 40 is secured to a second end 54 of the region of filter media 26. The second end cap 40 defines a central liquid flow conduit 56 therethrough in liquid flow communication with the central open volume 50 defined by the filter media 26.

After a period of use, the filter media 26 becomes occluded, and it is time to change the filter. To service the filter assembly 24, the cover member 30 is removed from the tank 12, and the filter cartridge 36 is removed from the remaining portion of the filter assembly 24. A new filter cartridge 36 would then be provided and operably assembled with the cover member 30 into the bowl 36 and re-secured to the flange 42 and the tank 12.

Figure 4:
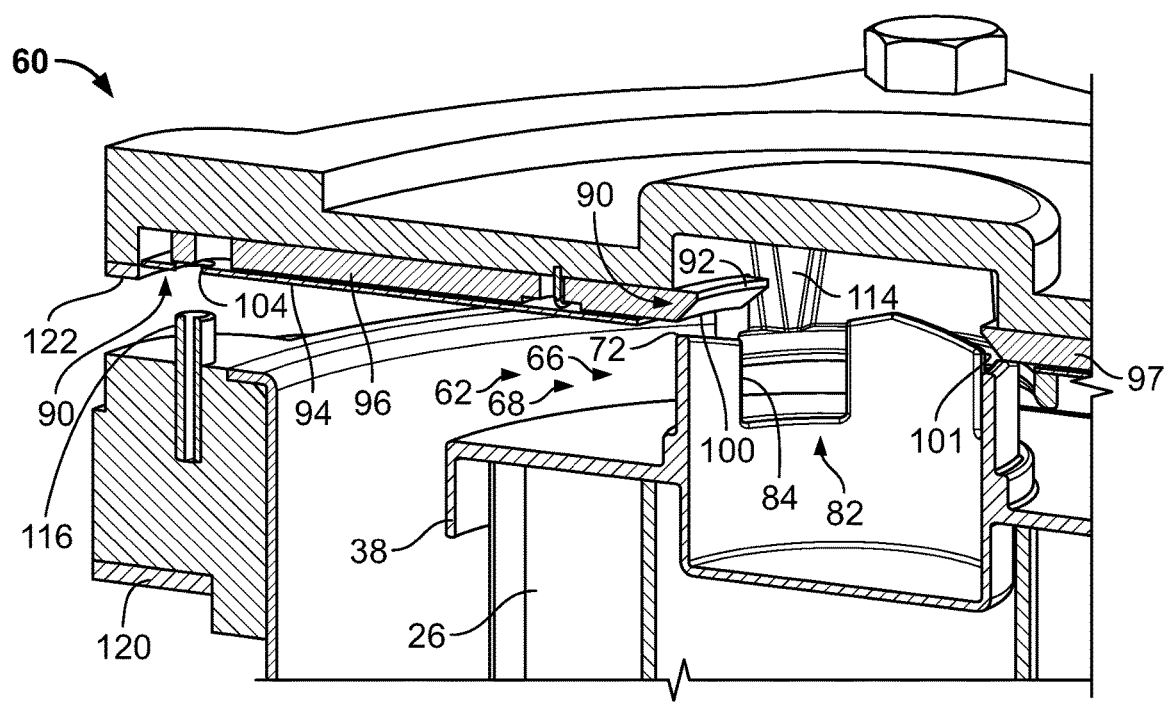
FIG. 4 is an enlarged, perspective, cross-sectional view of a portion of the filter cartridge, a flange, and the cover arrangement of FIG. 2, with the cover arrangement being in a locked orientation.
Figure 5:
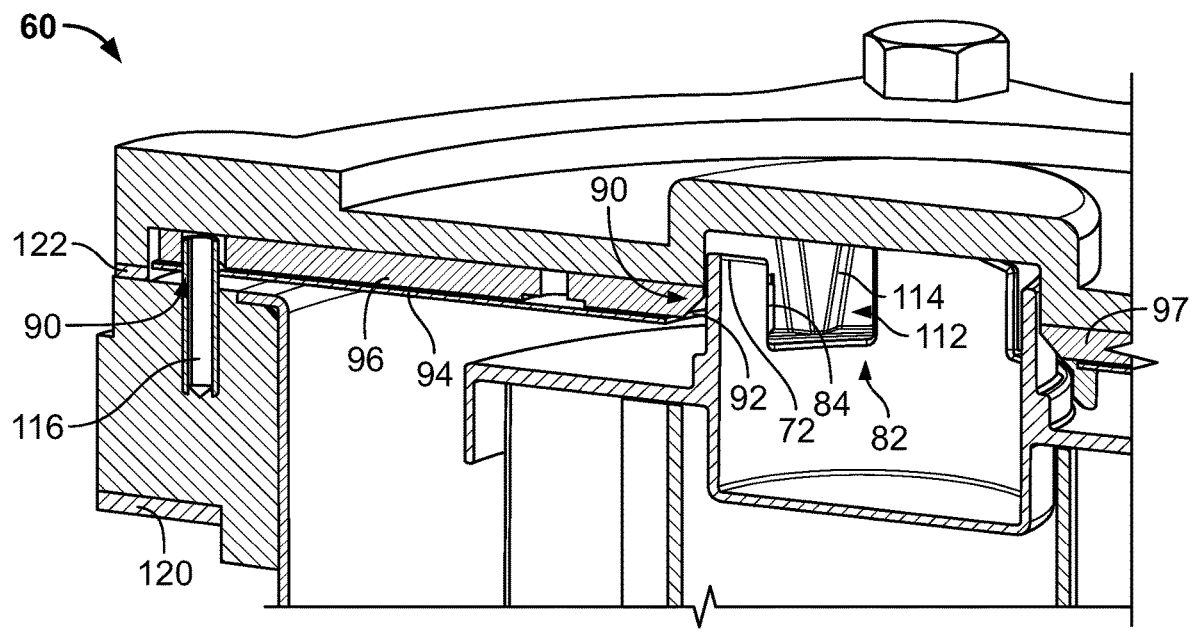
FIG. 5 is the same view as FIG. 4 but showing the cover arrangement in an unlocked orientation and showing the cover member operably secured to the remaining portion of the filter assembly.

The filter assembly 24 includes a safety construction at 60 (FIGS. 4 and 5). The safety construction 60 ensures that filter cartridge 36 is properly installed in the filter bowl 34. If filter cartridge 36 is not properly installed in the bowl 34, the flange 42 and cover member 30 will be prevented from being secured in a closed position.

In the embodiment of FIGS. 4 and 5, the safety construction 60 includes a protrusion arrangement 62. The protrusion arrangement 62 actuates or engages a cover member arrangement 64, which includes the cover member 30 and other components, to allow securement of the cover member 30 to the flange 42.

In the embodiment shown, the protrusion arrangement 62 includes a plurality of protrusions 66. In the example shown, the protrusions 66 are integral with and preferably molded as a same part of the first end cap 38.

In the example shown, the protrusions 66 are part of an axial stem 68. The axial stem 68 has a portion 70 projecting away from the filter media 26. An end of the axial stem 68 remote from the filter media 26 includes a locker engagement tip 72 (FIG. 4) to permit the cover member 30 to close the liquid filter assembly 24.

In the embodiment shown, the axial stem 68 includes a portion molded as the same piece as the first end cap 38.

In preferred implementations, the axial stem 68 defines a plurality of fingers or spaced axial projections 74 each having an end 76 (FIG. 3) with an apex 78 defined by sides 80. In example embodiments, the ends 76 of the spaced axial projections can function as the locker engagement tip 72.

Many embodiments are possible. In some examples, each apex 78 is defined by sides 80 extending at an angle, around the apex 78, within the range of 110 degrees-170 degrees.

In other example embodiments, each apex 78 is defined by an angle, around the apex 78, within the range of 130 degrees-150 degrees.

In example embodiments, each apex 78 is not positioned in a center of an associated axial projection end 76. In other words, each apex 78 is off-center of the associated axial projection end 76.

In FIGS. 4-5, the axial stem 68 can include a guide channel arrangement 82. The guide channel arrangement 82 includes at least one guide channel 84 for engagement with the cover member 30. The at least one guide channel 84 terminates at the locker engagement tip 72.

Many embodiments are possible. In this example, the guide channel arrangement 82 includes at least three guide channels 84.

Other observations about the example filter cartridge 36 include a plurality of retaining clips 86 projecting away from the filter media 26. In the examples shown in the drawings, the retaining clips 86 comprise a portion of the first end cap 38. In the examples shown, there are two retaining clips 86 at opposite sides of the outer perimeter of the first end cap 38.

Figure 2:
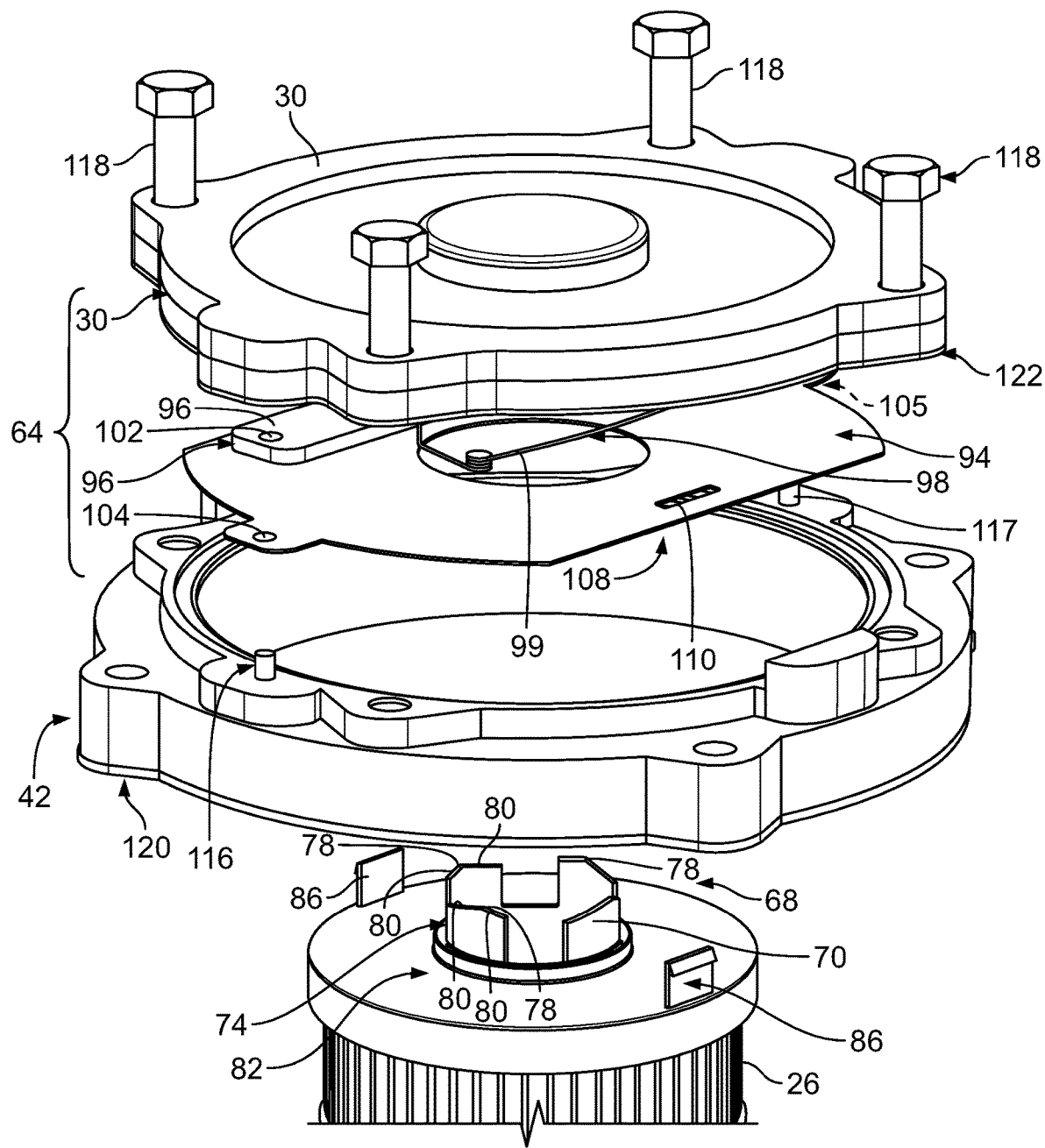
FIG. 2 is an upper exploded perspective view of a cover arrangement and a portion of a filter cartridge, used in the system of FIG. 1.
Figure 3:
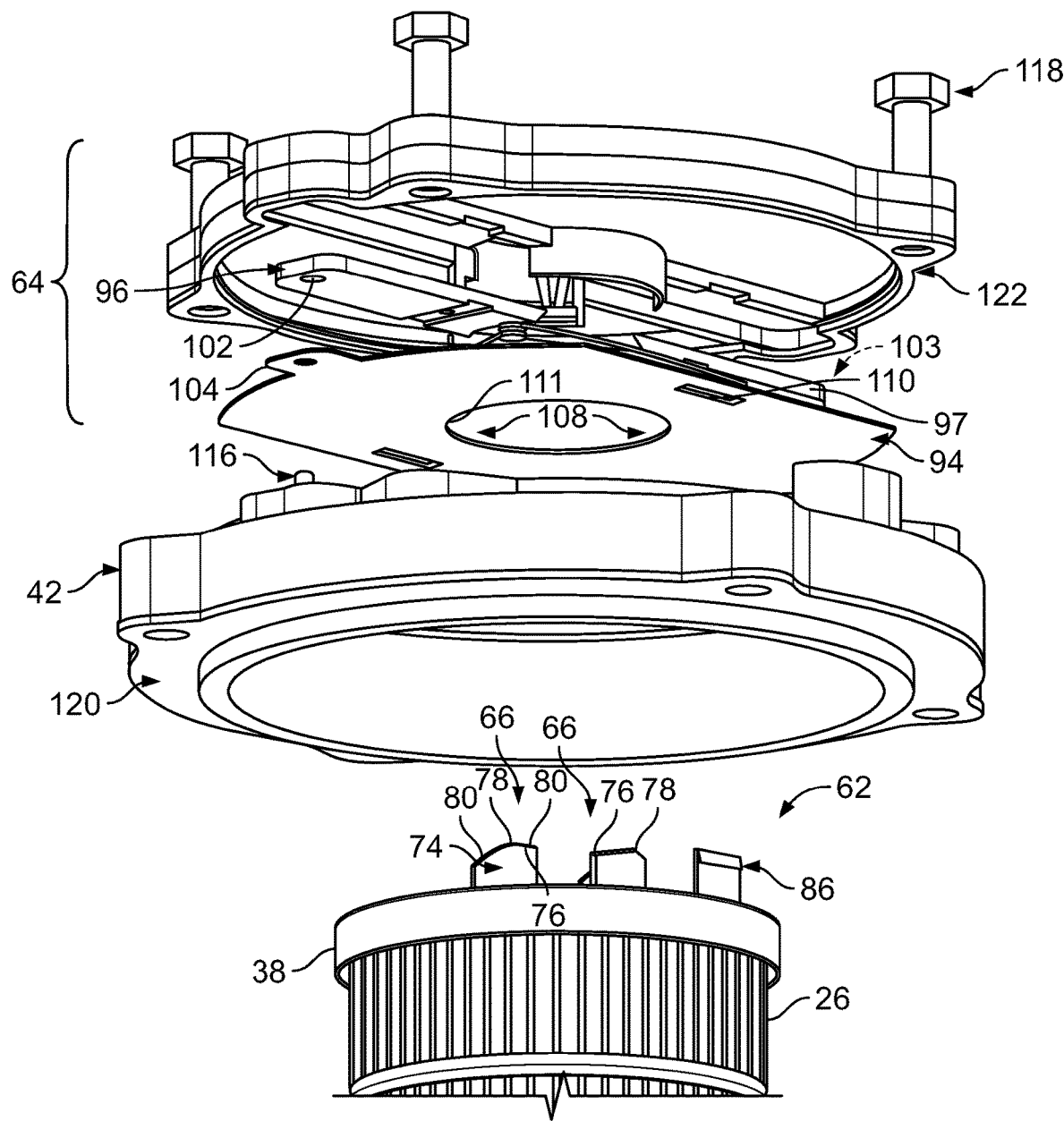
FIG. 3 is a lower exploded perspective view of FIG. 2.

Turning now to FIGS. 2 and 3, the cover arrangement 64 includes cover member 30 and a lock arrangement 90. The lock arrangement 90 is part of the safety construction 60. The lock arrangement 90 is secured to the cover member 30 and includes a first locked orientation (FIG. 5) and a second unlocked orientation (FIG. 4).

The lock arrangement 90 in the first locked orientation secures the cover member 30 against securement to the filter assembly 24 if a filter cartridge 36 is not oriented in the filter bowl 34. The lock arrangement 90 in the second, unlocked orientation allows the cover member 30 to be secured to the filter assembly 24 when the filter cartridge 36 is oriented in the filter bowl 34.

The lock arrangement 90 includes an actuator arrangement 92. The actuator arrangement 92 is configured for moving the lock arrangement 90 from the locked orientation to the unlocked orientation upon engagement within the filter cover arrangement 64 when the filter cartridge 36 is properly and operably positioned in the filter assembly 24 in use.

Also visible in FIG. 3 is an optional plate arrangement 94. The optional plate arrangement 94 can be secured to the cover member 30 with the lock arrangement 90 therebetween.

Many examples are possible. In this example, the lock arrangement 90 includes at least one slide member 96. In this example, the slide member 96 is mounted on the plate arrangement 94. A biasing member 98 is positioned to bias the at least one slide member 96 into the locked orientation.

The at least one slide member 96 has a filter cartridge engagement portion 100 configured to be engaged, in use, by the filter cartridge 36 to bias the at least one slide member 96 against the biasing member 98 to move the lock arrangement to the unlocked orientation.

In this example, the lock arrangement 90 includes two opposed slide members 96, 97, each of which is biased by the same biasing member 98, and each of which has a filter cartridge engagement portion 100, 101.

Many embodiments are possible. In this embodiment, the two slide members 96, 97 each have a pin-receiving aperture 102, 103. The pin-receiving aperture 102, 103 is at an end of the slide member 96, 97 opposite of the filter cartridge engagement portion 100, 101. The pin-receiving aperture 103 is the same in appearance as the aperture 102, and is indicated with a broken arrow line in FIG. 3.

The optional plate arrangement 94 includes a pair of opposite openings 104, 105 (105 being under the cover member 30 in FIG. 2; it should be understood that in this example embodiment, the plate arrangement 94 is symmetrical, with the opening 105 having the same structure as opening 104). The openings 104, 105 are positioned for alignment with a respective one of the pin-receiving apertures 102, 103 of the slide members 96, 97.

In the example shown, the biasing member 98 is a spring 99.

In this example embodiment, the plate arrangement 94 further includes a cartridge-retention arrangement 108. The cartridge-retention arrangement 108 can include, in this example, slots 110, 111 going through opposite edges of the plate arrangement 94. The slots 110 are positioned to operably receive the cartridge retaining clips 86.

The cover member 30 may also include a cartridge positioning projection 112 arrangement therein. In the example shown in FIG. 4, the cartridge positioning projection arrangement 112 includes a plurality of circumferential and radially inward projections 114 which are received by the guide channels 84.

FIG. 1 illustrates the filter assembly 24 mounted in the tank 12. The cover member arrangement 64 is operably mounted on the access opening 16 and operably mounted to the flange 42. The filter bowl 34 is secured to the flange 42, and the cover member arrangement 64 is releasably mounted to the flange 42 to cover or close the filter bowl 34. The filter cartridge 36 is positioned within the filter bowl 34. The axial stem 68 of the first end cap 38 is engaging the two slide members 96, 97 of the lock arrangement 90 and biasing them into the unlocked orientation, which allows the cover member 30 to be in closed engagement with the flange 42.

The flange 42 is shown as being secured to the tank 12 at the perimeter of the tank opening 16.

Reference is now made to FIG. 4. In FIG. 4, the flange 42 can be seen before the filter cartridge 36 is engaged with the cover member arrangement 64. At least one locking pin 116 projects from the flange 42. If no filter cartridge is secured to the cover member arrangement 64 to unlock the locking arrangement 90, the locking pin 116 will prevent the cover member arrangement 64 from being secured to the flange 42 and cover the access opening 116. The locking pin 116 is sized to be received by the lock arrangement 90.

In FIG. 2, the flange 42 and cover member arrangement 64 are shown in an exploded, perspective view. This view illustrates that the at least one locking pin 116 includes two locking pins 116, 117. Both of the locking pins 116, 117 are sized to be received within the pin-receiving apertures 102, 103 of the slide members 96, 97.

When the optional plate arrangement 94 is used, the two locking pins 116, 117 are received within the openings 104, 105 of the plate arrangement 94, when the lock arrangement 90 is moved into the unlocked orientation. The axial projections 74 on the axial stem 68 will engage against the actuator arrangement 92, which moves the slide members 96, 97 against the biasing member 98, which aligns the openings 104, 105 with the pin-receiving apertures 102, 103 of the slide members 96, 97. This alignment then allows the locking pins 116, 117 to project in and be received by the openings 104, 105 and pin-receiving apertures 102, 103. This allows the cover member 30 to engage against the flange 42 and be secured in place relative to the tank 12.

In preferred implementations, the retaining clips 86 of the filter cartridge 36 are releasably engaged with the plate arrangement 94 at the filter cartridge retaining slots 110, 111. Preferably, the retaining clips 86 will extend through and snap into the slots 110, 111. This will also orient or index the filter cartridge 36 in a correct rotational direction so that the axial stem 86 will be able to engage the actuator arrangement 92 and unlock the lock arrangement 90.

The engagement between the retaining clips 86 and the cartridge retention slots 110, 111 also ensures that during servicing, when the cover member arrangement 64 is removed from the tank 12, the filter cartridge 36 is removed along with it.

For servicing, the old filter cartridge 36 will be disconnected from the cover member arrangement 64 by disengaging the clips 86 and the slots 110, 111. A new filter cartridge 36 is then provided, and the new filter cartridge 36 is attached to the cover member arrangement 64 by connecting the retaining clips 86 with the cartridge retention arrangement 108; in this embodiment, this is done by snapping the retaining clips 86 into the slots 110, 111. When this is done, the lock arrangement 90 is moved from its locked orientation to its unlocked orientation by engagement between the axial stem 86 and the slide members 96, 97. This aligns the pin-receiving apertures 102, 103 with the locking pins 116, 117, which will allow the cover member arrangement 64 to be secured axially against the flange 42.

The guide channel arrangement 82 of the filter cartridge 36 can also be helpful in rotationally indexing the filter cartridge 36 in a rotational position that allows for engagement between the actuator arrangement 92 and the lock engagement tips 72 of the axial stem 68. As can be seen in FIG. 5, the guide channel arrangement 82, in the form of guide channels 84 are in juxtaposition with the cartridge positioning arrangement 112. The projections 114 of the cartridge positioning arrangement 112 will be within the guide channels 84 to help guide the filter cartridge 36 into a rotational position that will allow for unlocking of the lock arrangement 90.

The filter assembly 24 includes a seal member 120 which will form a seal between and against the flange 42 and the top wall 18 of the tank 12 adjacent to the perimeter 44 of the access opening 16. A plurality of bolts 118 can be used to tighten and releasably secure the cover member 30 to the tank 12. When the cover member 30 is tightened against the top wall 18 of the tank 12, the seal member 120 is squeezed between and against the flange 42 and tank 12 to form the seal therebetween.

A seal member 122 is between the cover member 30 and flange 42. In this example, it is shown attached to the cover member 30. When the cover member 30 is tightened against the top wall 18 of the tank 12, the seal member 122 is squeezed between and against the cover member 30 and the flange 42 to form the seal therebetween.

A method of locking the cover member 30 against securement to the assembly of the flange 42 and filter bowl 34 should be apparent from the above. One step of the method will include removing the filter cartridge 36, as variously characterized above, from the cover member 30 as variously characterized above and pulling the axial stem 68 of the filter cartridge 36 out of engagement with the actuator arrangement 92 to allow the lock arrangement 90 to bias into locked orientation.

The locked orientation includes the slide members 96, 97 being in a radial position such that the pin-receiving apertures 102, 103 are out of alignment with the locking pins 116, 117. When an optional plate arrangement 94 is also used, the openings 104, 105 in the plate arrangement 94 are also out of alignment with the locking pins 116, 117.

A method of unlocking the cover member 30 for securement to assembly of the flange 42 and filter bowl 34 should also be apparent from the above. The method includes the step of pushing the axial stem 68 of the filter cartridge 36 as variously characterized herein, into the cover member arrangement 64 and is variously characterized herein, to push the actuator arrangement 92 and move the slide members 96, 97 to the unlocked orientation.

This step can include moving the slide members 96, 97 radially to a position in which the pin-receiving apertures 102, 103 are in alignment with the locking pins 116, 117. When optional plate arrangement 94 is also used, the openings 104, 105 are moved into alignment with the locking pins 116, 117. This then allows the cover member 30 to be axially positioned against the flange 42. The cover member 30 can then be removably secured to the flange 42. In the example shown in FIG. 2, the plurality of bolts 118 can be used to secure the cover member 30 to the flange 42.

The above are example principles. Many embodiments can be made applying these principles.

What is claimed is:

1. A filter cartridge for use as a serviceable filter cartridge with a liquid filter assembly in an in-tank filter system with a cover member; the filter cartridge comprising:
   (a) a region of filter media defining a central open volume,
      (i) the region of filter media having first and second ends;
   (b) a first end cap secured to the first end of the region of filter media and closed to the central open volume; the first end cap having a section secured to the first end of the filter media;
   (c) an axial stem positioned on the first end cap including a plurality of spaced axial projections; each projection having a portion projecting away from the filter media and longitudinally further from the filter media than said section of the first end cap;
      (i) an end of each of the projections remote from the filter media comprising a locker engagement tip to permit the cover member to close the liquid filter assembly;
   (d) a second end cap secured to the second end of the region of filter media; the second end cap defining a central liquid flow conduit therethrough, in liquid flow communication with the central open volume defined by the filter media; and
   (e) a plurality of retaining clips along an outer periphery of the first end cap; each retaining clip having a hook at a free end adapted to engage a plate arrangement secured to the cover member, each hook being axially projecting away from the filter media.

2. A filter cartridge according to claim 1 wherein:
   (a) the axial stem includes a guide channel arrangement including at least one guide channel therein for engagement with the cover member;
      (i) the at least one guide channel terminating at the locker engagement tip.

3. A filter cartridge according to claim 2 wherein:
   (a) the guide channel arrangement includes at least three guide channels.

4. A filter cartridge according to claim 1 wherein:
   (a) the region of filter media defines a cylindrical shape.

5. A filter cartridge according to claim 1 wherein:
   (a) each axial projection has an end with an apex defined by sides.

6. A filter cartridge according to claim 5 wherein:
   (a) each apex is defined by sides extending at an angle, around the apex, within the range of 110°-170°.

7. A filter cartridge according to claim 6 wherein:
   (a) each apex is defined by an angle within the range of 130°-150°.

8. A filter cartridge according to claim 5 wherein:
(a) each apex is not positioned in a center of an associated axial projection end.

\* \* \* \* \*